No. 695,575. Patented Mar. 18, 1902.
T. G. MELISH.
FLOUR SIFTER.
(Application filed Oct. 14, 1901.)
(No Model.)
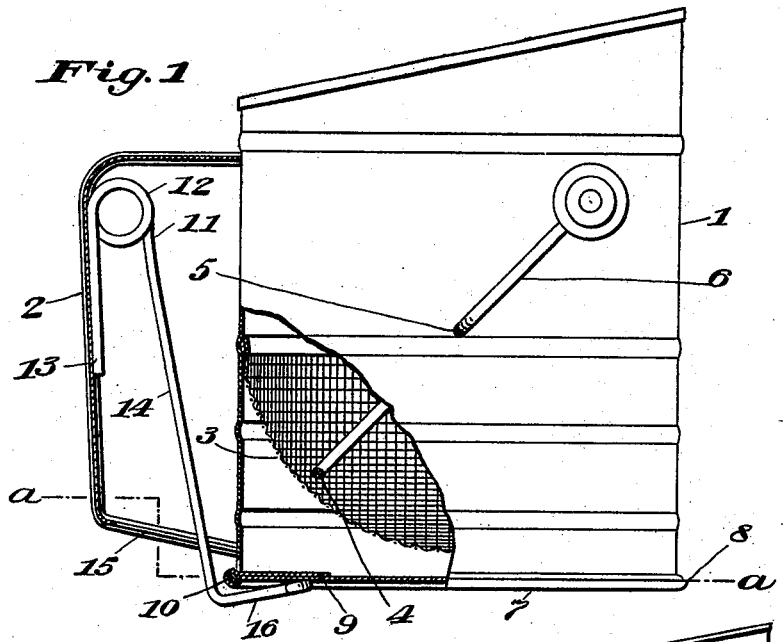
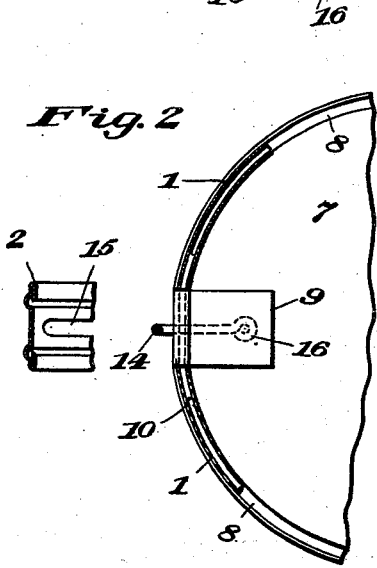
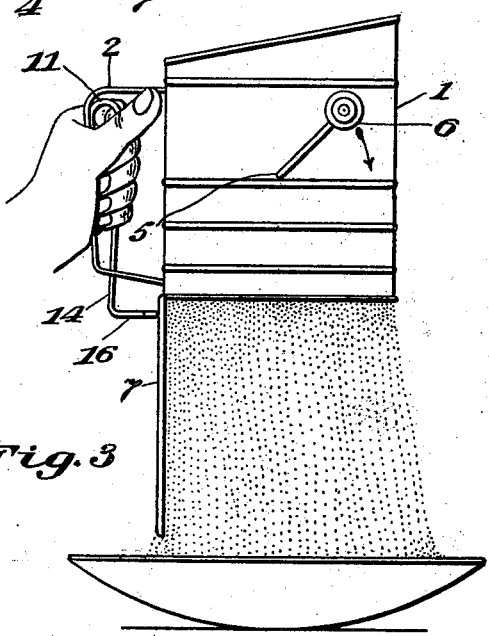
Witnesses
Inventor
Thomas G. Melish,
by John Elias Jones,
his Attorney.

UNITED STATES PATENT OFFICE.

THOMAS G. MELISH, OF CINCINNATI, OHIO.

FLOUR-SIFTER.

SPECIFICATION forming part of Letters Patent No. 695,575, dated March 18, 1902.

Application filed October 14, 1901. Serial No. 78,575. (No model.)

*To all whom it may concern:*

Be it known that I, THOMAS G. MELISH, a citizen of the United States of America, and a resident of Cincinnati, in the county of Hamilton and State of Ohio, have invented certain new and useful Improvements in Flour-Sifters, of which the following is a specification.

This invention relates to certain improvements in flour-sifters, and has for its object to provide a device of this character of a simple and inexpensive construction having improved means for preventing the escape of flour at the bottom when the device is not in use.

The invention consists in a flour-sifter comprising a casing having an opening at its bottom, a bottom plate held in hinged relation to the casing and arranged when raised to close the opening at the bottom thereof, a spring bent to produce two arms extended alongside of each other at one side of the casing, and means to hold one arm of said spring in fixed relation with the casing, the other arm of said spring being movable toward and away from the fixedly-held arm and having engagement with the said bottom plate to actuate the same.

The invention also contemplates certain novel features of the construction, combination, and arrangement of the several parts of the improved flour-sifter, whereby certain important advantages are attained and the device is made simpler, cheaper, and otherwise better adapted and more convenient for use, all as will be hereinafter fully set forth.

The novel features of the invention will be carefully defined in the claims.

In the accompanying drawings, which serve to illustrate my invention, Figure 1 is an elevation showing a flour-sifter constructed according to my invention, one side of the device being broken away to show the interior construction. Fig. 2 is an enlarged partial section taken through the lower part of the device in the plane indicated by line *a a* in Fig. 1. Fig. 3 is a view drawn to a smaller scale and showing the device as it appears when in use.

In the views, 1 indicates a cylindrical open-ended casing for the sifter, this casing being made from sheet metal and being provided with a handle 2 at its back part, the handle being formed from a strip or piece of sheet metal having its end portions bent at angles from its central part and secured at their extremities to the side of the cylindrical casing 1.

3 indicates a concave sheet of wire-netting extended across the interior of the sheet-metal casing 1, through the meshes of which the flour is adapted to be passed, and 4 indicates an agitator formed from wire and carried on a shaft 5, extended across the casing above the screen 3, the shaft being provided outside of the casing with a crank-handle 6, whereby it may be turned to agitate the flour within the sifter. The construction of the sifter so far as described is old and well known, and I make no claim thereto in this application.

7 indicates a circular plate of flat metal and of a diameter to close the bottom of the cylindrical casing 1, said plate 7 being formed with a seat 8 extended about its perimeter and adapted to receive the beaded lower edge of said casing when the said plate is applied to close the open lower end of the casing. The plate 7 has at one side a projecting tongue 9, which is bent over and secured by soldering or otherwise upon the upper surface of the plate and forms one member of a hinge, being passed about a pintle 10, the ends of which are held in the beaded lower edge of the casing at a point immediately beneath the handle 2 of the sifter. By means of the hinge thus formed the plate 7 is adapted to be raised and lowered, and when in raised position said plate serves to close the open lower end of the casing of the sifter in such a way as to prevent the escape of any flour therefrom.

For holding the plate 7 normally in raised position to close the open bottom of the casing I employ a spring 11, formed from a length of spring-wire centrally bent to produce a spiral 12, from which are extended two arms. The rear arm 13 of the spring is secured, by means of solder or the like, upon the inner side of the central portion of the handle 2, while the forward arm 14 of said spring is extended down between the handle and the wall of the casing 1, as clearly shown in Fig. 1, and has its lower end passed through a slotted opening 15, produced in the bent lower end of the handle. The lower extremity of the arm 14 of the spring is extended down below the bottom of the sifter and is bent forwardly, as indicated at 16, said forwardly-bent part 16 being extended in an upwardly-inclined direction, so as to rest at its front end against the under side of the hinged bottom plate 7 just in front of the hinge thereof.

The spring 11 serves, as above stated, to hold the hinged bottom plate 7 normally in raised position, so as to keep the bottom of the sifter-casing closed to prevent the escape of flour therefrom when the device is not in use; but when the handle 2 is grasped by the hand the fingers of the operator will pass between the forward arm 14 of the spring and the casing-wall, as indicated in Fig. 3, and by pressing the said forward arm of the spring toward the handle the pressure of the forwardly-bent lower end 16 of the spring-arm is withdrawn from beneath the hinged bottom plate, whereby the said plate is permitted to fall by gravitation, as indicated in Fig. 3, so that the bottom of the casing 1 is opened for the escape of flour therefrom.

The device constructed as above described is of an extremely simple and inexpensive nature and is especially well adapted for use, since it insures against the dropping or spilling of the flour from the sifter when the same is not in actual use. Since the releasing means for the hinged bottom of the casing is arranged within the handle itself, it will also be obvious that said releasing means is rendered very easy and convenient of operation. It will also be obvious from the above description that the improved sifter is capable of considerable modification without material departure from the principles and spirit of the invention, and for this reason I do not wish to be understood as limiting myself to the precise form and arrangement of the several parts of the device as herein set forth.

Having thus described my invention, I claim—

1. In a flour-sifter or the like, the combination of a casing having an opening at its bottom and provided with a handle, a plate pivotally held on the casing and adapted, when raised, to close the opening at the bottom thereof, and a spring having one end held in fixed relation with respect to said handle and having its other end movable and adapted for engagement with said hinged plate to hold the same normally raised in position to close the opening in the bottom of the casing, said spring having a portion extended alongside of and adapted for movement with respect to the handle for actuating the movable end of the spring to permit said bottom plate to be lowered, substantially as set forth.

2. In a flour-sifter or the like, the combination of a casing having an opening at its bottom and provided with a handle, a plate hinged to the casing at a point beneath the handle and adapted, when in raised position, to close the opening at the bottom of the casing, and a spring having one end secured to the handle and having its other end movable and rested on the hinged plate to hold the same normally in raised position, said spring having an intermediate portion extended alongside the handle in position to be grasped by the hand for actuating the movable end of the spring to release the hinged plate and permit the same to drop, substantially as set forth.

3. In a flour-sifter or the like, the combination of a casing having a handle slotted at its lower part, said casing having an opening at its bottom, a plate hinged to the casing at a point beneath the handle and adapted, when raised, to close the opening at the bottom of the casing, and a spring bent at its central part to produce two arms, one of which is connected to the inner side of the handle and the other of which is extended down between the handle and the casing-wall, through the slot at the lower part of the handle, and has its lower end movable and rested beneath the bottom plate for holding the same normally in raised position, substantially as set forth.

Signed at Cincinnati, Ohio, this 12th day of October, 1901.

THOS. G. MELISH.

Witnesses:
JOHN ELIAS JONES,
JOSEPH COX, Jr.